April 3, 1945.  A. W. GARDES  2,372,820
CONDUIT CONNECTOR FOR FLUID PRESSURE CONTROL
Filed April 29, 1943  2 Sheets-Sheet 2
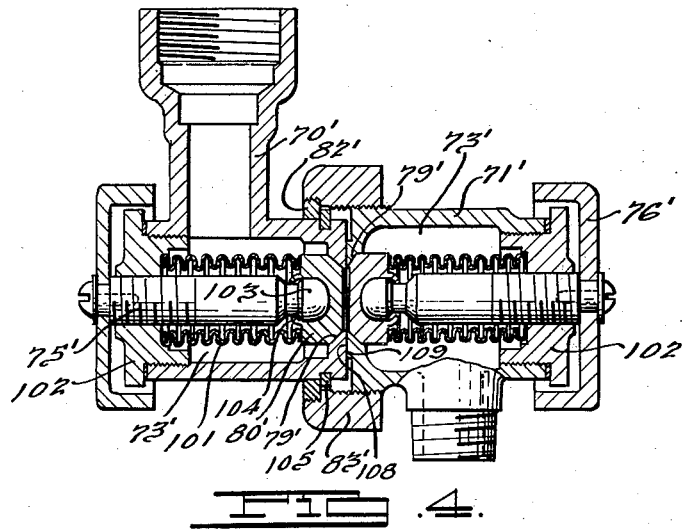
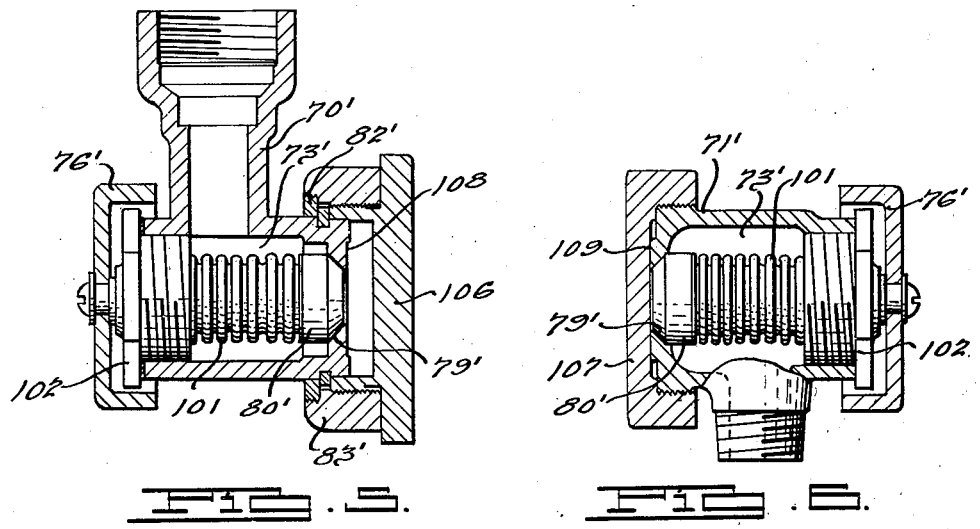
INVENTOR
Alfred W. Gardes.
BY Joseph Farley
ATTORNEY

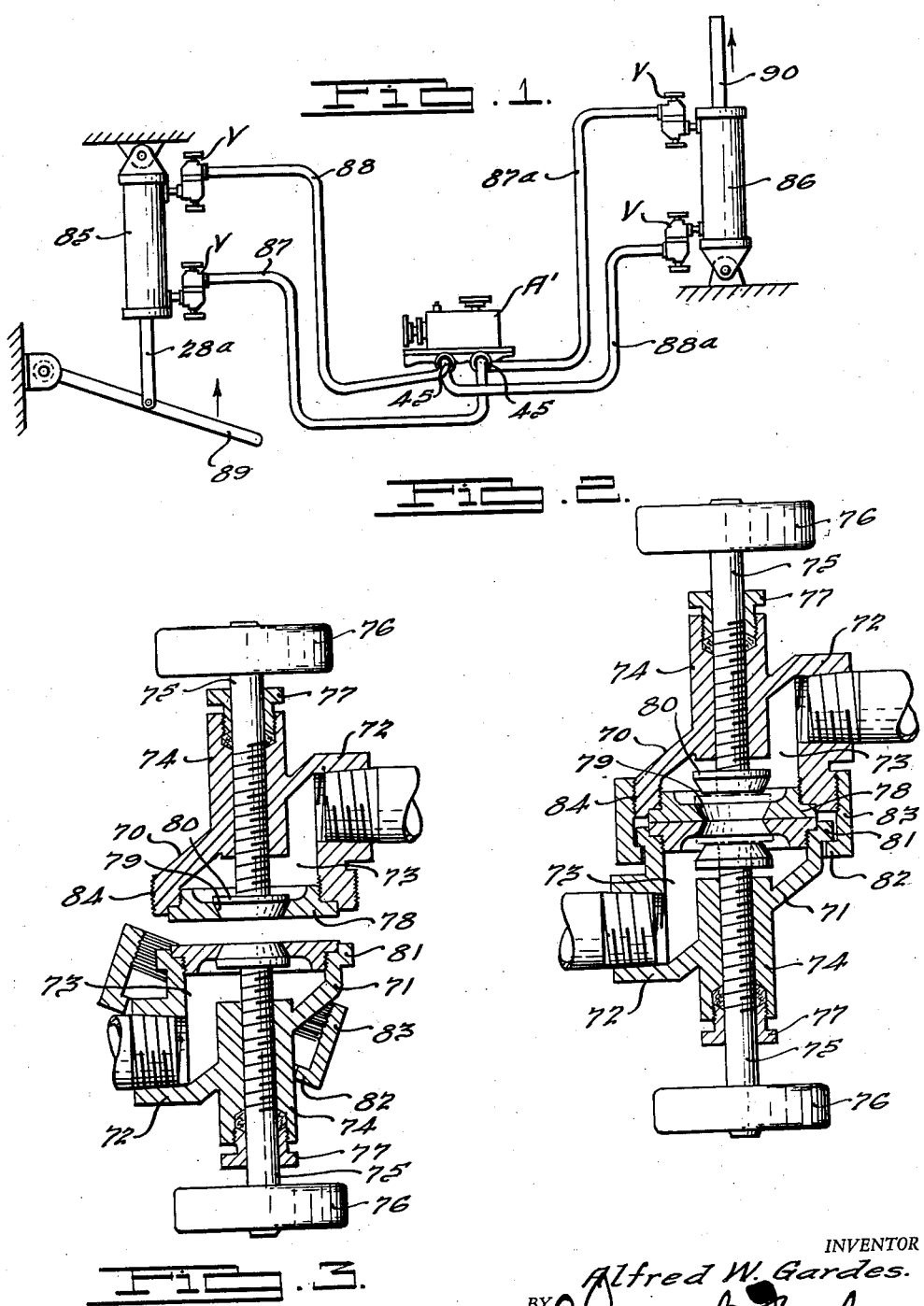

Patented Apr. 3, 1945

2,372,820

UNITED STATES PATENT OFFICE 2,372,820

CONDUIT CONNECTOR FOR FLUID PRESSURE CONTROL

Alfred W. Gardes, Detroit, Mich., assignor to McCord Corporation, a corporation of Maine Application April 29, 1943, Serial No. 484,989

4 Claims. (Cl. 284—17)

This invention relates to conduit connectors for fluid pressure control mechanisms and has for its principal object the provision of a connector for the conduits of fluid pressure controls which will allow the conduits to be separated at desired points in the system without loss of fluid therefrom so that the connection may be again made when desired and the system again placed in immediate condition for use with the adjacent connected portions of the conduit filled with fluid and ready for operation.

This application is a continuation-in-part of my application, Serial No. 451,592 filed July 20, 1942, entitled Fluid pressure control. In that application there is disclosed a fluid pressure control mechanism by means of which movement of a main control may be duplicated with fidelity and accuracy at a remote work station. Examples of use of such mechanism are the control units in paper making and textile machinery where it is necessary that certain of the units be speeded up or slowed down to compensate for changing conditions. A further use for such a mechanism is for the operation of a single unit from a distant control station such as, for example, the control and sighting mechanism for search lights, machine guns and anti-aircraft guns.

Particularly when units of the type above identified are used for remote control of mechanisms which must be transported frequently, it is very necessary that there be provided suitable means to disconnect the conduits carrying the fluid whenever desired, and in order that the mechanism be again available to be assembled for use in the shortest possible time, it is also necessary that when the unit is again assembled that the fluid in the conduits be in the same condition as when the unit was disassembled, namely, that none of the fluid should be lost by the separation of the conduit.

It is therefore an object to provide a conduit connection for a fluid pressure control adapted to provide quickly detachable connections in conduits leading from one unit of a fluid pressure control mechanism to another so that if it is desired to change the location of either the control member or the operating member, the communicating lines may be closed to trap the entire body of fluid contained in either of the portions of the connecting lines and so that when the connecting lines are reconnected there will still remain the entire solid uninterrupted column or body of fluid between the two devices and nowhere will any air be admitted to the lines.

The above and other objects of the present invention will appear more fully in the following more detailed description and by reference to the accompanying drawings forming a part hereof and wherein:

Fig. 1 is a partially diagrammatic showing of a fluid pressure control system employing several conduit connectors in the fluid pressure lines thereof. This general diagrammatic view is similar to Fig. 7 of my co-pending application, Serial No. 451,592, previously mentioned herein.

Fig. 2 is an enlarged detail partly in section of one of the connectors, parts being shown in full lines in the position they would occupy when the conduit is connected for operation and including a dotted line showing of the position of the parts when the connector has trapped fluid in the adjacent portions of the conduit preparatory to disconnecting.

Fig. 3 is a view similar to Fig. 2 but with the parts shown disconnected and the parts in position such as to retain the fluid trapped in the separate portions of the conduit.

Fig. 4 is a section through a modified form of conduit connector with the parts shown secured together but with the closures trapping the fluid in the adjacent conduits in closed position ready to be disconnected.

Fig. 5 shows one of the parts of the conduit connector shown in Fig. 4 disconnected with a protective cap assembled thereto.

Fig. 6 shows the other portion of the connector in Fig. 4 in its disconnected position also with a protective cap assembled.

Referring to the drawings, Fig. 1 is a diagrammatic showing of a type of fluid pressure control unit on which the connectors of this invention might be used. Such a diagram is here used as an illustration of the application of the connectors and is a reproduction of Fig. 7 of my co-pending application, Serial No. 451,592. In Fig. 1 the reference character 85 represents a control unit and the reference character 86 an operating unit. The control unit 85 consists of a single cylinder having pipes 87, 88 connected to the respective ends of the cylinder, the construction of the cylinder and piston being like that shown in Fig. 2 of my above identified co-pending application. The pipes 87 and 88 communicate respectively through fittings 45 of a storage reservoir A' with the pipes 87—a and 88—a leading to the opposite ends of the cylinder in the operating unit 86. Any suitable means such as a pivoted lever 89 may be employed for actuating the piston of the control unit in which case the piston rod 28—a of the unit may be connected directly to the lever 89. Likewise any suitable means may be employed for connecting the piston rod of the operating unit to the member to be actuated as indicated by the reference character 90. In the manner illustrated and described in my co-pending application, the fluid pressure system is kept supplied with fluid from reservoir A' and any movement of the lever 89 and the rod 28—a will be faithfully reproduced by movement of the rod 90 because of the fluid connection of the two units through the conduits 87, 88 and 87—a and 88—a.

In Fig. 1, four connector units V are shown, and specific location in the conduits may, of course, be changed to suit conditions but by their use, as shown, it is the intention to provide for disconnection of the four conduits. It would also be possible if desired to put additional connectors in the system when conditions so require.

Figs. 2 and 3 show construction of one of the connectors V, which consists of two separate valve bodies 70, 71, each of which is provided with a side boss 72 of similar construction suitably threaded to receive a fluid carrying conduit or pipe of a system such as shown in Fig. 1. The threaded opening of each boss 72 communicates directly with the interior valve chamber 73 of its respective valve body. Each valve section 70 and 71 is also provided with a threaded valve stem boss 74 into which is screwed a valve stem 75 having at the outer projection end thereof a valve handle or hand wheel 76, a suitable stuffing box 77 being provided for each valve stem to prevent leakage of fluid. Screwed into the end of each valve chamber 73 is a valve seat 78 having a central frustro-conical valve seating surface 79 against which is adapted to be seated a valve plug 80 secured to the inner end of the respective valve stem 75, the valve plug 80 being of frustro-conical shape. The valve bodies 70, 71 are constructed to be detachably secured together by means of an ordinary pipe union construction and for this purpose the valve body 71 is provided at its inner end with an annular flange 81 adapted to be engaged by an inwardly projecting lateral flange 82 of a coupling or union nut 83, the interior of which is threaded to engage with an exterior screw thread 84 provided on the end of the valve body 70. Union nut 83 is assembled to the valve body 71 by slipping the union nut 83 over the stem end of the valve body before any conduit is connected thereto; that this is possible, is evident by inspection of the position of the union nut as shown in Fig. 3.

The manner in which valve V functions is as follows: One of the valve bodies 70 or 71, as the case may be, is connected by means of its threaded boss 72 with a short connecting nipple or length of pipe leading to one of the cylinders, while one of the main lengths of pipe, as for instance, the pipe 87, is connected to the boss 72 of the other valve chamber body 71. When the system is in operating condition, the valve stems 75 are screwed up to raise the valve plugs 80 off their seats 79 and thereby to establish free communication between the respective valve chambers 73 of the valve bodies 70 and 71, such a condition being shown by the solid line positions of the plugs 80 as shown in Fig. 2. When, however, it is desired to disconnect the operating or control units by separating the conduits at any or all of the valves V, the valve plugs 80 are brought into sealing contact with their respective seating surfaces until the parts are in the condition shown by the dotted lines in Fig. 2 and by the full lines in Fig. 3. As the valve seats 78 are in tight sealing engagement when two valve bodies 70 and 71 are in assembled condition, as shown in Fig. 2, and as the end flat faces of the valve plugs 80 are substantially in contact when the valve plugs 80 are brought into sealing engagement with their respective valve seats 79, none of the fluid which was in the valve chambers 73 or which is contained in the respective pipe which communicated with said chambers 73 can find a path of escape at the joint between the two valve bodies 70 and 71, so that when the union or coupling 83 is unscrewed all of the fluid that was in the system is completely retained in the respective portions of the conduit which has been separated. The two parts of the unit in their disconnected condition are shown in Fig. 3. When the parts have been transferred or removed to a new location, or whenever desired, the respective valve bodies 70 and 71 may again be coupled together and the faces of valve seats 78 held together and subsequently the valve stems 75 screwed up to raise the valve plugs 80 from their respective seats and thereby again establish full communication to the fluid pressure column or lock between the respective units.

A modified form of the connector is shown in Figs. 4, 5 and 6 of the drawings. As shown in Fig. 4 this connector employs valve bodies 70', 71' with other parts which correspond with the parts shown in Figs. 2 and 3 insofar as they have been numbered with reference characters to which a prime has been added. However, the major difference between the two types is in the use of a bellows type of seal which has been indicated by the reference character 101. This bellows type of seal has one end thereof connected with a threaded insert 102 fitting into the top of the valve body and the other end secured to the valve plug 80'. The bellows type seal 101 surrounds the valve stem 75' and serves as a positive seal to prevent fluid from leaking out around the stem. The end of the valve stem 75' is preferably secured to the valve plug 80' by a ball and socket joint 103, the ball being secured in the socket by peening over at assembly a flange 104 formed on the plug 80', as shown in Fig. 4. The union nut 83' is held in place by a split ring 105 which contacts the flange 82' of the nut which may be made in a form of a separate part threaded into the union nut 83 or otherwise secured thereto. The portions of the valve bodies adjacent the conical surfaces 79' contacting the similarly shaped conical faces of the plug 80' are formed integral with their respective valve bodies and the surfaces making contact adjacent the openings to form a seal when the valve bodies are secured together are so formed that there is a recess 108 in the valve body surface portion on 70' contacted by an annular projection 109 on the valve body 71', as shown. The contacting surfaces are ground and the respective relation between these surfaces and the conical surfaces and faces of the valve plugs 80' is such that a very small space, approximately .010 in actual practice, is left between the faces of plugs 80' when the valves are closed in the position shown in Fig. 4. This small clearance is to assure that the surfaces 108 and 109 will positively join, and for all practical purposes the .010 space is negligible as far as loss of fluid is concerned. The limit in allowed clearance would be that which would produce noticeable loss of fluid.

The two parts 70' and 71' may be disconnected by releasing the union nut 83' and the parts put in the respective conditions represented by Fig. 5 and Fig. 6. After the parts are separated, provision is made to protect the separated ends by the provision of a cap 106 which screws into the union nut 83' and has suitable flanges as shown to adequately protect the threads from injury. A cap 107 is also provided to fit on the threads of the valve body 71', as is shown in Fig. 6.

It is understood that the operation of the connector shown in Figs. 4, 5 and 6 is substantially the same as that previously described in connection with the form of the unit shown in Figs. 2 and 3.

Although I have described my invention as applied to a specific structure, it is understood that the various modifications are intended within the scope of the following claims.

I claim:

1. A conduit connector comprising, a pair of separable valve body portions formed to fit together and each enclosing a fluid receiving chamber and having an opening positioned to form a communicating passage between said chambers when said portions are fitted together, valve closures for each of said openings of said separable portions shaped to close said openings and having faces formed to fit closely adjacent each other when said closures are in closed position, a valve stem connected to each of said valve closures for moving it to and from closed position, an expandable bellows member surrounding each of said stems having one end thereof secured to the interior of its respective separable body portion and the opposite end secured to its respective valve closure.

2. A conduit connector comprising a pair of separable valve body portions, each enclosing a fluid receiving chamber and each having a substantially flat wall portion at one end thereof having an opening therein which forms a communicating passage between said chambers when said portions are secured together, a frustro-conical valve seat surrounding each of said openings, the said wall of one of said body portions being provided with an annular projection arranged in concentric relation with said opening and valve seat and the wall of the other body portion having a complementary recess in which said projection is adapted to fit, the exterior of the side wall of one of said body portions adjacent said end wall having a projecting screw threaded portion and the other of said body portions having secured thereto a union nut for engaging said screw threads to clamp said body portions together with the end wall portions thereof in tightly fitting contacting engagement, each of said body portions having the end thereof opposite said end wall interiorly screw threaded and having a closure cap screwed therein, each of said closure caps being provided with a threaded bore, a valve stem screwed within said threaded bore, a valve plug swivelly secured to the inner end of said valve seat and having a frustro-conical valve surface for engagement with the frustro-conical valve seat of the opposite end wall, and an expandable bellows member surrounding each of said valve stems, mounted within said chamber and having one end thereof secured to said valve plug and the other end to said valve closure.

3. A conduit connector comprising a pair of separable valve body portions, each enclosing a fluid receiving chamber and each having a substantially flat wall portion at one end thereof having an opening therein which forms a communicating passage between said chambers when said portions are secured together, a frustro-conical valve seat surrounding each of said openings, the said wall of one of said body portions being provided with an annular projection arranged in concentric relation with said opening and valve seat and the wall of the other body portion having a complementary recess in which said projection is adapted to fit, the exterior of the side wall of one of said body portions adjacent said end wall having a projecting screw threaded portion and the other of said body portions having secured thereto a union nut for engaging said screw threads to clamp said body portions together with the end wall portions thereof in tightly fitting contacting engagement, each of said body portions having the end thereof opposite said end wall interiorly screw threaded and having a closure cap screwed therein, each of said closure caps being provided with a threaded bore, a valve stem screwed within said threaded bore, a valve plug swivelly secured to the inner end of said valve seat and having a frustro-conical valve surface for engagement with the frustro-conical valve seat of the opposite end wall, and an expandable bellows member surrounding each of said valve stems, mounted within said chamber and having one end thereof secured to said valve plug and the other end to said valve closure, and a cup-shaped actuating handle secured to the outer end of each valve stem and adapted when said valve plug is in closed position to fit closely adjacent to and surround said closure cap.

4. A conduit connector comprising a pair of separable valve body portions, each enclosing a fluid receiving chamber and each having a substantially flat wall portion at one end thereof having an opening therein which forms a communicating passage between said chambers when said portions are secured together, a frustro-conical valve seat surrounding each of said openings, the said wall of one of said body portions being provided with an annular projection arranged in concentric relation with said opening and valve seat and the wall of the other body portion having a complementary recess in which said projection is adapted to fit, the exterior of the side wall of one of said body portions adjacent said end wall having a projecting screw threaded portion and the other of said body portions having secured thereto a union nut for engaging said screw threads to clamp said body portions together with the end wall portions thereof in tightly fitting contacting engagement, each of said body portions having the end thereof opposite said end wall interiorly screw threaded and having a closure cap screwed therein, each of said closure caps being provided with a threaded bore, a valve stem screwed within said threaded bore, a valve plug swivelly secured to the inner end of said valve seat and having a frustro-conical valve surface for engagement with the frustro-conical valve seat of the opposite end wall, and an expandable bellows member surrounding each of said valve stems, mounted within said chamber and having one end thereof secured to said valve plug and the other end to said valve closure, and a pair of thread protecting caps, one adapted to be screwed into the threads of said union nut and the other over the cooperating threads of the other body portion to protect said threads from injury when said body portions are separated.

ALFRED W. GARDES.